United States Patent
Hauck et al.

[11] 3,822,581
[45] July 9, 1974

[54] AUTOMOTIVE ENGINE EXHAUST GAS COMPOSITION SENSING APPARATUS

[75] Inventors: Franz Hauck, Denkendorf; Joachim Poppel, Reichenbach, both of Germany

[73] Assignee: Robert Bosch GmbH, Stuttgart, Germany

[22] Filed: Feb. 22, 1973

[21] Appl. No.: 334,925

[30] Foreign Application Priority Data
Mar. 30, 1972 Germany............................ 2215641

[52] U.S. Cl. ..................................... 73/23, 73/116
[51] Int. Cl. ........................................... G01m 15/00
[58] Field of Search................................. 73/116, 23

[56] References Cited
UNITED STATES PATENTS
3,461,727   8/1969   Everhard et al. .............. 73/421.5 R
3,581,469   6/1971   Davis................................ 73/23 X
3,593,023   7/1971   Dodson............................. 73/23 X Primary Examiner—Jerry W. Myracle
Attorney, Agent, or Firm—Flynn & Frishauf

[57] ABSTRACT

To prevent dirt, moisture, and other contamination present in the exhaust gases from automotive engines to reach sensitive sensing elements of exhaust gas sensing apparatus, a thermal condensing-type separator is interposed in the gas flow from the exhaust of the internal combustion engine to the sensing element, preferably cooled by compressed air which is additionally utilized to suck off precipitated, or separated contamination from the separating device, and to maintain a pressure differential of the contamination separated from the exhaust gases to provide for self-cleaning of the separator.

4 Claims, 1 Drawing Figure

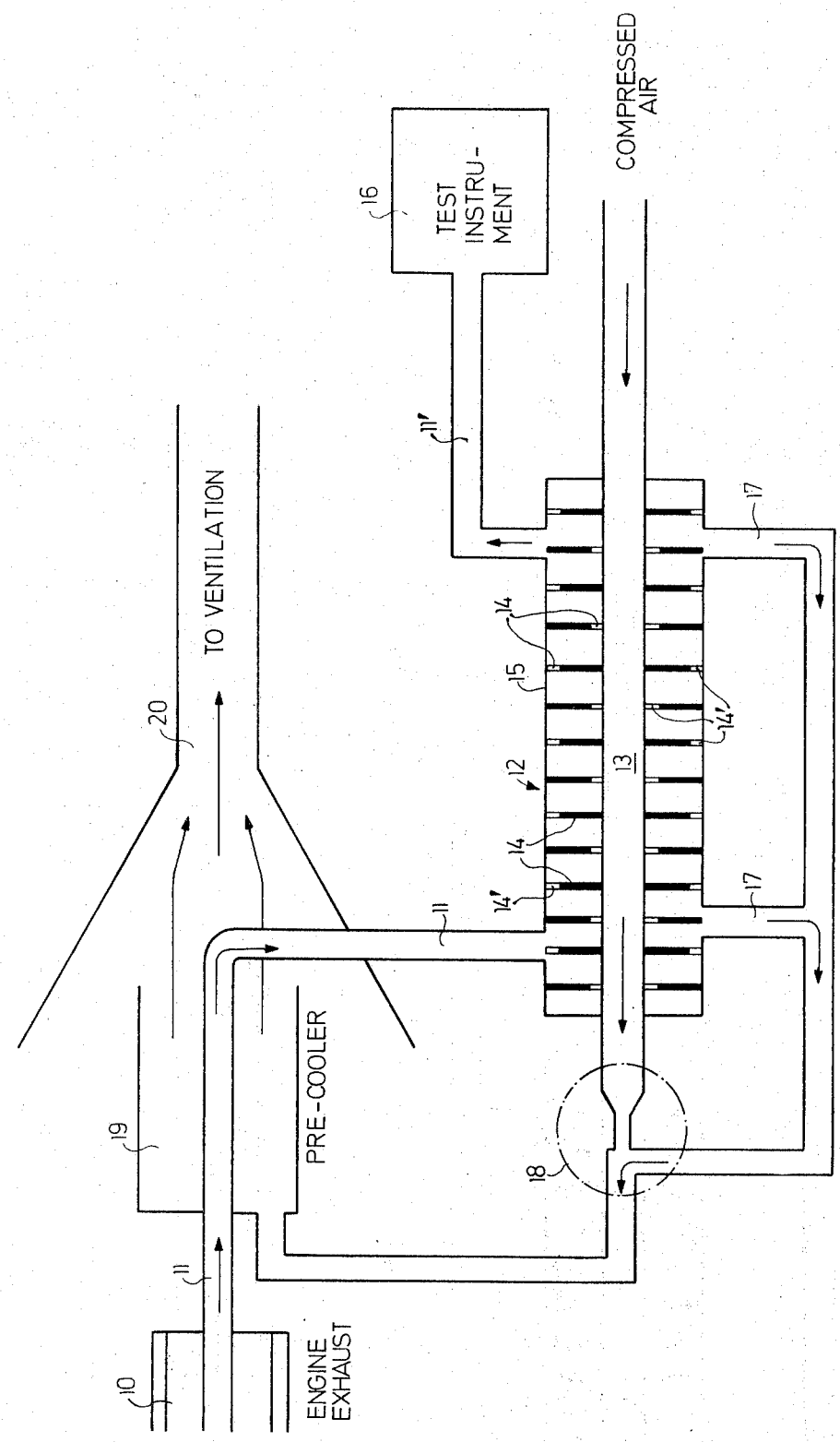

AUTOMOTIVE ENGINE EXHAUST GAS COMPOSITION SENSING APPARATUS

The present invention relates to an exhaust gas analysis apparatus, and more particularly to an apparatus to analyze exhaust gases from internal combustion engines in connection with adjustment, or tuning of the engine for minimum noxious emission, in which the sensing element itself is protected from contamination due to dirt, moisture, and the like contained within the exhaust of the internal combustion engine.

Garages, test installations, inspection stations and the like, in which automotive engines are repaired and tested, require apparatus in which the composition of exhaust gases is to be analyzed. The data derived from such analysis machines, for example the relative proportion of carbon monoxide in the exhaust of the internal combustion engine are then used to adjust the engine, so that the exhaust gases will not exceed legally determined limits. Adjustment of the engine to provide for minimum noxious exhaust can be carried out, for example, by adjusting the carburetor, or fuel injection systems of the internal combustion engine, to so control the fuel-air ratio being applied to the internal combustion engine that the exhaust emission will have a composition which contains a minimum of noxious exhaust and, in any event, falls below limits established by law.

Measuring, test and inspection instruments used in garages, inspection stations or the like, are usually connected to the exhaust system, typically the exhaust pipe beyond the muffler, of the internal combustion engine. It has been customary to place a filter in front of the test instrument, as such, so that contamination, such as dirt particles, and the like, are trapped before the measuring instrument can be affected. Such test apparatus using a filter has the disadvantage that the filter has a tendency to clog, since the contaiminating particles in the exhaust gas, as well as moisture, and liquid particles, usually present in the exhaust gases, tend to plug the interstices of the filter. This undesirably affects the measuring results, and prevent reliable testing of the engine, and measuring of the true composition of the exhaust gases.

It is an object of the present invention to provide a test and measuring device for exhaust gases from internal combustion engines, and more particularly from automotive-type internal combustion engines, in which the actual testing or sensing apparatus is protected against contamination by dirt and moisture particles, common in the exhaust gases of the internal combustion engine. Further, the apparatus should be so designed that flow of exhaust gases to the test apparatus is not inhibited, and further should be reliable and not require special knowledge or technology in its use, and require only equipment, devices, or utility supplies customarily available in garages and inspection stations, and which do not represent hazards to users.

SUBJECT MATTER OF THE PRESENT INVENTION

Briefly, a separator is included in the line or conduit connecting the exhaust gases from the exhaust pipe of the engine under test to the actual sensing element, the separator being so designed that liquid and dirt particles are separated out, by precipitation and condensation from the gaseous components which are to be tested.

The invention will be described by way of example with reference to the accompanying drawing, wherein the single figure illustrates, in highly schematic form, a separating system and apparatus for use in accordance with the present invention.

The exhaust pipe of the internal combustion engine is schematically indicated at 10, the remainder of the engine not being shown, and being, for example, an automotive gasoline internal combustion engine. A conduit or duct 11 is coupled to the exhaust pipe to lead exhaust gases — contaminated by liquid and dirt particles — to a separator 12. Separator 12 comprises a housing 15 in which a series of baffles are arranged. A central duct 13 is located within the housing to which baffles are likewise secured. The baffle plates 14 are formed with openings 14' therethrough, to permit gases conducted from inlet pipe 11 to pass to outlet pipe 11' and then to the actual test or sensing instrument 16.

Basic operation: The exhaust gas conducted over pipe 11 to separator 12 is cooled in the separator 12, and moisture particles condense on the baffles, or fins 14. Contamination, and dirt particles, and other solids contained in the exhaust gas are bound or captured by the moisture in the exhaust gas, and will drop by gravity to the lower portion of the separator 12. The gas being conducted to the test instrument 16 through outlet pipe 11' thus is cooled, and has been freed of contaminating moisture and dirt particles.

The liquid precipitate from the cooling fins or vanes 14 is collected at the bottom of the separator 12 and conducted in contaminating outlet lines 17. Preferably, a continuous trough, for example in the form of a small depression or notch formed in the housing wall 15 communicates beneath all the fins or baffles 14, so contaminated, contaminate, dirty liquidcan liquid can carried off by the lines 17. Two such lines are shown, although more may be used. The lines 17 communicate to a second cooler 19, which at least partly surrounds the inlet pipe 11. This second cooler provides for pre-cooling of the extremely hot exhaust gases 11 passing from the exhaust pipe 10 to the separator 12, so that, initially already, the temperature of the exhaust gases is lowered from that existing at the end of pipe 10, before the gases are applied to separator 12. The liquid, derived from the bottom of the separator 12 is removed by an underpressure arrangement formed by an injection nozzle 18, and a Venturi, which is connected to the same central compressed air duct 13, which has passed through the separator 12. -. This compressed air carries along the moisture and contaminated particles collected in line 17, and applies the now compressed, contaminated air to the cooler 19. After having passed through the pre-cooler 19, it is introduced into an exhaust tube 20, which maybe in the form of the usual exhaust funnel provided in most garages to prevent air from contamination with confined spaces, with engines running. Any exhaust gas, not needed by the test instrument 16, or exhausted therefrom, can likewise be connected to the gas removal system 20. Exhaust gas not accepted by the test instrument 16, for example by being throttled therefrom, is likewise passed through ducts 17, and then through the pre-cooler 19, to be removed by final exhaust 20.

The system of the present invention is particularly useful when tests are to be made of the exhaust gases during full-load operation of the internal combustion engine. Under such operation, drying and pre-cleaning of the exhaust gases, removal of condensed water and other moisture, and cooling of the exhaust gases are completely carried out, without influencing or affecting the composition of the exhaust gases which are to be tested. The volume of the separator 12 is preferably so designed that there is no perceptable delay in response of the test instrument 16 from actual changes in the exhaust gas composition at the end of exhaust pipe 10.

Various changes and modifications may be made within the inventive concept.

We claim:

1. Exhaust gas composition sensing apparatus, for connection to the exhaust (10) of internal combustion engines, tosense the composition of exhaust gases thereof having gas analysis means (16) and means conducting exhaust gas from the exhaust (10) to the analysis means (16), comprising means (12) for separating gaseous components from moisture components and solid components contained in the exhaust gases, including a heat exchanger having a heat exchange cooling chamber through which exhaust gases pass, heat exchange surfaces (14) located within the cooling chamber, and a coolant chamber (13);

a source of compressed air connected to the coolant chamber and passing therethrough, to cool the heat exchange surface (14), an injection nozzle (18) connected to the outlet of said coolant chamber, and duct means communicating with the heat exchange chamber to remove liquid and contaminating particles from the heat exchange chamber by ejection around said injection nozzle.

2. Apparatus according to claim 1, further comprising duct means (11) connecting the exhaust of the engine to the separator (12);

and a pre-cooler (19) surrounding, at least in part, said duct means (11), and having means for supplying thereto as a coolant the ejected mixture of compressed air, moisture and contaminating particles from around said injection nozzle (18).

3. Apparatus according to claim 2, further comprising suction removal means (20) located adjacent said pre-cooler (19) and removing the contaminated compressed air from the pre-cooler.

4. Exhaust gas composition sensing apparatus, for connection to the exhaust (10) of internal combustion engines, to sense the composition of exhaust gases thereof having gas analysis means (16), means for conducting exhaust gas from the exhaust (10) to the analysis means (16), and means interposed in said conducting means for separating gaseous components from moisture components and solid components contained in the exhaust gases, comprising a condensing chamber (12) having condensing fins therein, duct means connected to the condensing fins, and means connecting the duct means to a source of compressed air to cool the condensing fins, so that exhaust gases contacting the condensing fins will have moisture contained therein condense on the fins, the moisture trapping and binding contaminating solids within the exhaust gases;

contamination removal means located at the bottom of the condensing chamber to remove condensed moisture and contaminating particles carrier therein;

and an ejection nozzle connecting to receive compressed air from the separating chamber, after having passed therethrough, and in ejection communication with the contaminated liquid removal means, to provide for ejection of contaminated liquid, and solid particles down therein, and excess exhaust gas from the separator and to provide for forced flow of said contaminated, condensed moisture and solid particles from the separator.

* * * * *